(12) United States Patent
Sjögren

(10) Patent No.: US 7,393,161 B2
(45) Date of Patent: Jul. 1, 2008

(54) METAL CUTTING INSERTS WITH ABRASIVE BODIES

(75) Inventor: Clas Sjögren, West Midlands (GB)

(73) Assignee: Sandvik Intellectual Property AB, Sandviken (SE)

( * ) Notice: Subject to any disclaimer, the term of this patent is extended or adjusted under 35 U.S.C. 154(b) by 21 days.

(21) Appl. No.: 11/375,567

(22) Filed: Mar. 15, 2006

(65) Prior Publication Data

US 2006/0234086 A1    Oct. 19, 2006

(30) Foreign Application Priority Data

Mar. 16, 2005    (SE) .................................... 0500591

(51) Int. Cl.
*B23B 27/20* (2006.01)
(52) U.S. Cl. .................. 407/113; 407/115; 407/114; 407/116; 407/119
(58) Field of Classification Search ................ 407/113, 407/114, 116, 117, 119, 66, 67
See application file for complete search history.

(56) References Cited

U.S. PATENT DOCUMENTS

| | | | | |
|---|---|---|---|---|
| 4,203,690 A * | 5/1980 | Tanaka et al. | ............... | 407/119 |
| 4,854,784 A * | 8/1989 | Murray et al. | ............... | 407/114 |
| 5,888,029 A * | 3/1999 | Boianjiu | ...................... | 407/66 |
| 6,655,881 B2 * | 12/2003 | Shimizu | ..................... | 407/113 |
| 6,742,970 B2 * | 6/2004 | Oles et al. | ................... | 407/113 |
| 6,960,049 B2 * | 11/2005 | Inayama | ..................... | 407/103 |
| 2005/0183893 A1 | 8/2005 | Sjogren et al. | | |
| 2005/0271483 A1 | 12/2005 | Sjogren | | |

FOREIGN PATENT DOCUMENTS

WO    2004/105983 A1    12/2004
WO    2005/000519 A2    1/2005

* cited by examiner

*Primary Examiner*—Willmon Fridie
(74) *Attorney, Agent, or Firm*—Drinker Biddle & Reath LLP

(57) ABSTRACT

The present invention relates to a cutting tool insert of a generally polygonal shape provided with a ceramic tip in a recess in at least one of its corners with a bottom surface and at least one side surface. At least the bottom surface of the recess is provided with rails with a height h being from about 50 to about 100 µm, width w being from about 100 to about 200 µm and spaced at distance l from about 0.75 to about 1.25 mm. The invention also relates to a method of making such an insert using a grinding wheel of a suitable profile before or after sintering or in the pressing operation.

23 Claims, 3 Drawing Sheets

METAL CUTTING INSERTS WITH ABRASIVE BODIES

BACKGROUND OF THE INVENTION

The present invention relates to a cutting tool insert comprising a substrate and at least one ceramic sintered body preferably of polycrystalline diamond, PCD, or cubic boron nitride, cBN, bonded to the substrate with high strength and rigidity, and a method of manufacturing the same.

Cutting tool inserts for metal cutting purposes with edges of cBN, or a cBN-based material (hereinafter only referred to as "cBN"), or PCD are generally of polygonal shape provided with a PCD or cBN tip in a recess in at least one of its corners. The tips generally are of two different types. In the first type the whole tip is of cBN or PCD or a mixture of these. In the second type the tip is of cBN and/or PCD sintered onto a cemented carbide support. These tips are then brazed onto a regular cemented carbide insert and ground to the finished size. The tips are generally triangular but also more complicated shapes are known such as disclosed in WO 2004/105983. However, because of the high hardness of the PCD or cBN-materials the grinding operation should be restricted to a minimum. In addition, the geometry of the insert can make it very difficult to access some surfaces of the tip with a grinding wheel.

OBJECTS AND SUMMARY OF THE INVENTION

It is therefore an object of the present invention to provide a method of producing inserts for metal cutting purposes with edges of cBN or PCD, where the above mentioned limitations are alleviated as well as the insert.

In one aspect of the invention there is provided a cutting tool insert of a generally polygonal shape provided with a ceramic tip brazed in a recess in at least one of its corners with a bottom surface and at least one side surface wherein at least the bottom surface of the recess is provided with rails with a height h of from about 50 to about 100 µm, a width w of from about 100 to about 200 µm and spaced at distance 1 of from about 0.75 to about 1.25 mm.

In another aspect of the invention there is a method of making a cutting tool insert of a generally polygonal shape provided with a ceramic tip in a recess in at least one of its corners with a bottom surface and at least one side surface wherein at least the bottom surface of the recess is provided with rails with a height h of from about 50 to about 100 µm, a width w of from about 100 to about 200 µm and spaced 1 of from about 0.75 to about 1.25 mm apart.

BRIEF DESCRIPTION OF THE INVENTION

DETAILED DESCRIPTION OF THE INVENTION

Figure 1:
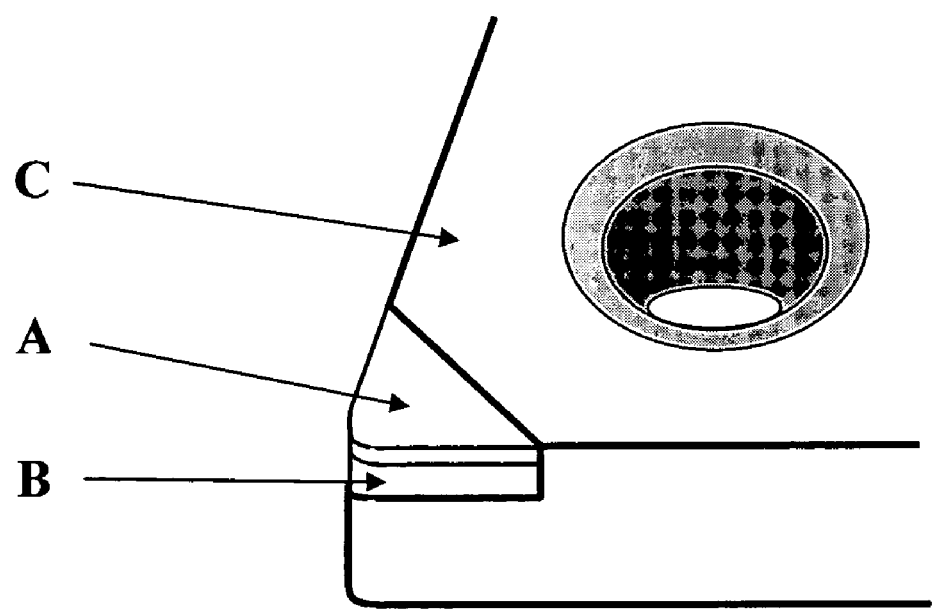
FIG. 1 shows in side view a cutting tool insert provided with a tip of cubic boron nitride, A, and a cemented carbide support, B, brazed to a cemented carbide substrate, C.

According to the present invention, there is provided a cutting tool insert of a generally polygonal shape provided with a PCD and/or cBN tip in a recess in at least one of its corners. The tip is generally triangular. The recess has a bottom surface and at least one side surface as shown in FIG. 1. The recess can be of a simple shape with one plane side surface but also more complex shapes are contemplated such as to provide a mechanical interlock as shown in U.S. patent applications Ser. Nos.10/857,922 and 11/002,664, the disclosures of which are herein incorporated in their entireities. The bottom surface E of the recess is provided with rails D which contact the bottom of the PCD or cBN tip with the height h of the rail being from about 50 to about 100 µm, the rail width w being from about 100 to about 200 µm and the rails being spaced apart at distance 1 of from about 0.75 to about 1.25 mm. Although not shown, the bottom of the tip which comes into contact with the top of the rails D is essentially planar as is the side of the tip which contacts side surface F.

In the method of the present invention, a cemented carbide insert is provided having in at least one of its corners a recess having at least one side surface F and a bottom surface E. The bottom surface E of the recess is provided with rails D having a height h of from about 50 to about 100 µm, a width w of from about 100 to about 200 µm and are spaced apart at a distance 1 of from about 0.75 to about 1.25 mm apart. If the recess is of a simple shape, it can be done by grinding before or after sintering using a grinding wheel with suitable profile. More complex shapes can be made in the pressing operation. For strength reasons and also in case of grinding to get some life out of the grinding wheel, the recess always has a corner radius R. A cBN or PCD tip of a suitable shape is placed in the recess in contact with the rails and brazed in the recess by conventional brazing methods. Finally, the insert is cleaned by grinding to remove the excess braze. As the bottom of the tip is essentially planar, when it is placed in the recess in contact with the rails, there will be gaps between the bottom surface of the tip and the bottom surface E of the recess. During brazing, these gaps maybe substantially filled with brazing material.

Figure 3:
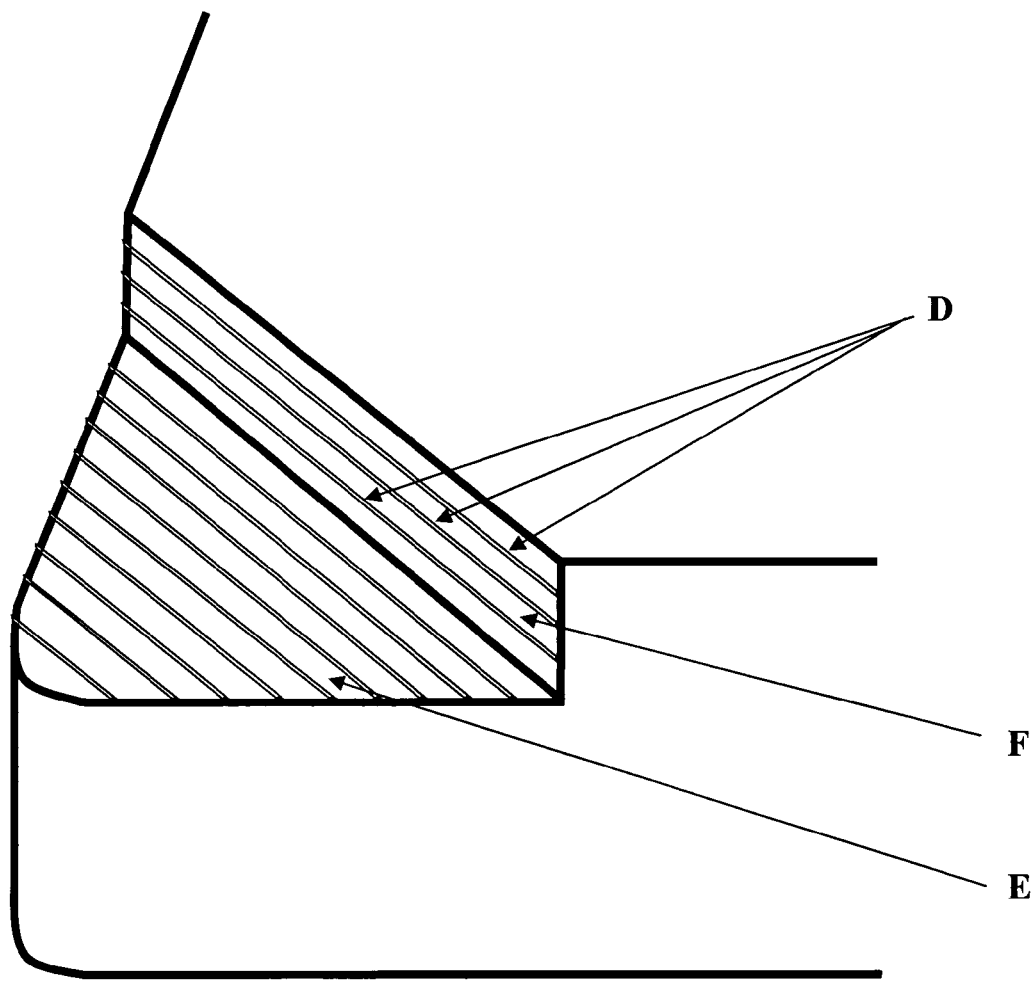
FIG. 3 shows another embodiment of the invention in which the rails D are provided on the side surface of the insert.

In the embodiment of FIG. 3, side surface F is also provided with rails D in addition to those on the bottom surface E of the recess. The rails on the side surface F also have the same height h, width w and a spacing 1 as those on the bottom surface.

The present invention has been described with reference to bodies of cBN or PCD but it is obvious that it can be applied to ceramic bodies in general. Also, although the rails D have been illustrated as being parallel to the side surface F, it is also within the purview of the skilled artisan to arrange these in any direction on either or both of the bottom surface E or side surface F. The rails D may cover the entire surface of the bottom surface E or side surface F or less than the entire surface(s). It is preferred that at the majority of said surfaces are provided with rails.

The invention is additionally illustrated in connection with the following examples, which are to be considered as illustrative of the present invention. It should be understood, however, that the invention is not limited to the specific details of the examples.

Figure 2:
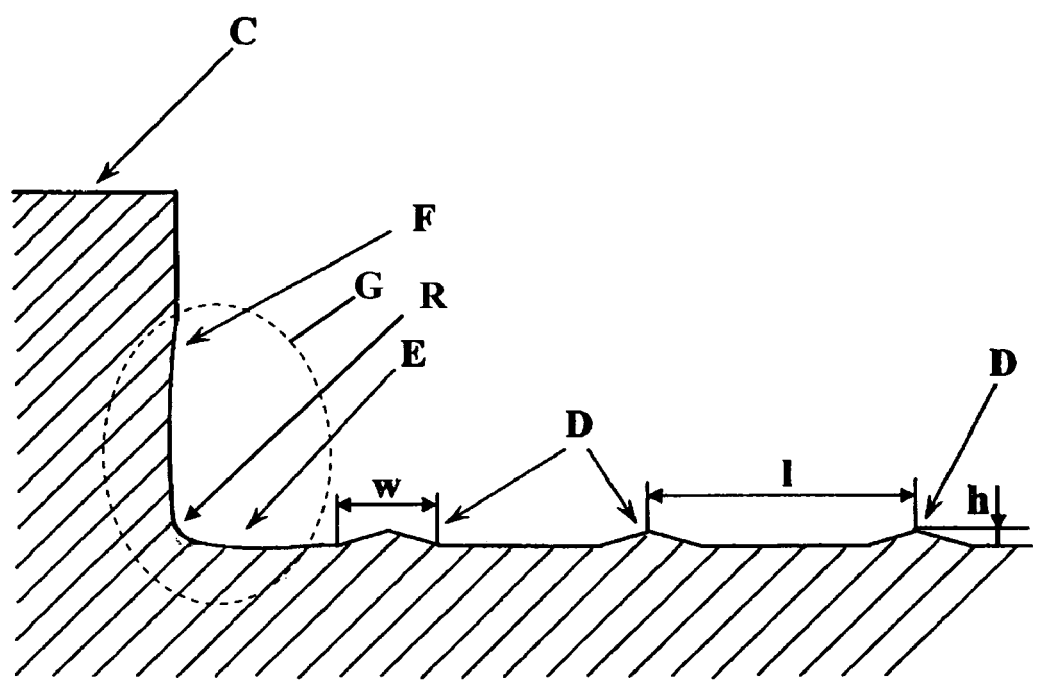
FIG. 2 shows part of a recess according to the present invention with a bottom surface, E, and a side surface, F, in which the bottom surface is provided with rails, D, with height, h, width, w, and mutual distance between them of 1.

EXAMPLE cBN-tipped cemented carbide inserts of type CCMW 09T304 were made according to the present invention. The cemented carbide had a composition of about 10 wt-% Co and as rest WC. The cBN-tip was triangular in shape, and had a base width and height of about 4 mm. The recess for the tip, including rails and corner relief radius (see feature G in FIG. 2) was all ground at the same time. This was accomplished by utilizing a specially designed electroplated grinding wheel, using diamonds as abrasive media. A number of recesses was made according to the invention, thus creating a recess or pocket with three rails on the bottom face 75 µm high, 100 µm wide and 1 mm apart, see FIG. 2. As reference, another group was processed according to prior art. After successfully brazing all inserts, parts were measured to evaluate the flatness and/or parallelism of the tip. The height of the insert was measured at all three corners of the triangular tip. The results in µm are found in the table below.

|  | Average | Minimum | Maximum |
| --- | --- | --- | --- |
| Conventional | 33 | 10 | 43 |
| Invention | 9 | 3 | 20 |

To evaluate if any difference in shear test could be noted due to the rails, three inserts with rails and three without were notched and put through the shear testing device. Comparable results were obtained.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. Cutting tool insert of a generally polygonal shape provided with a ceramic tip brazed in a recess in at least one of its corners with a bottom surface and at least one side surface wherein at least the bottom surface of the recess is provided with rails with a height h of from about 50 to about 100 µm, a width w of from about 100 to about 200 µm and spaced at a distance l of from about 0.75 to about 1.25 mm, wherein the side surface is also provided with rails.

2. A cutting tool insert of claim 1 wherein the recess is of a simple shape with one plane side surface.

3. A cutting tool insert of claim 1 wherein the recess is of a more complex shape providing a mechanical interlock.

4. A cutting tool insert of claim 1 wherein the ceramic tip is of PCD and/or cBN.

5. Method of making a cutting tool insert of a generally polygonal shape, comprising:
   forming a recess in at least one corner of a body of the insert; and
   securing a ceramic tip in the recess,
   wherein the recess includes a bottom surface and at least one side surface,
   wherein at least the bottom surface of the recess includes rails with a height h of from about 50 to about 100 µm, a width w of from about 100 to about 200 µm and spaced at a distance l of from about 0.75 to about 1.25 mm apart.

6. A method of claim 5 wherein the rails are made by grinding after sintering.

7. A method of claim 5 wherein the rails are made by grinding before sintering.

8. A method of claim 5 wherein the rails are made in a pressing operation.

9. A method of claim 5 wherein the ceramic tip is of PCD and/or cBN.

10. A method of claim 5 wherein the side surface is also provided with rails.

11. A method of claim 10 wherein the rails on the side surface are made by grinding after sintering.

12. A method of claim 10 wherein the rails on the side surface are made by grinding before sintering.

13. A method of claim 10 wherein the rails on the side surface are made in a pressing operation.

14. A method of claim 10 wherein the method comprises forming a corner relief radius for the recess.

15. A method of claim 14 wherein the recess and the rails are simultaneously formed.

16. A method of claim 10 wherein the ceramic tip is of PCD and/or cBN.

17. A method of claim 10 wherein securing includes brazing the ceramic tip into the recess.

18. A method of claim 5 comprising forming a corner relief radius for the recess.

19. A method of claim 5 wherein securing includes brazing the ceramic tip into the recess.

20. A method of claim 5 wherein the recess and the rails are simultaneously formed.

21. A cutting tool insert of claim 1 wherein the recess includes a corner relief radius.

22. A cutting tool insert of claim 1 wherein a surface of the ceramic tip in contact with the bottom surface of the recess is essentially planar.

23. A cutting tool insert of claim 1 wherein a surface of the ceramic tip in contact with the at least one side surface of the recess is essentially planar.

* * * * *